F. H. GIBBS.
WHEEL ATTACHING DEVICE FOR MINE CARS AND OTHER PURPOSES.
APPLICATION FILED JULY 26, 1918.
1,346,193.
Patented July 13, 1920.
2 SHEETS—SHEET 1.
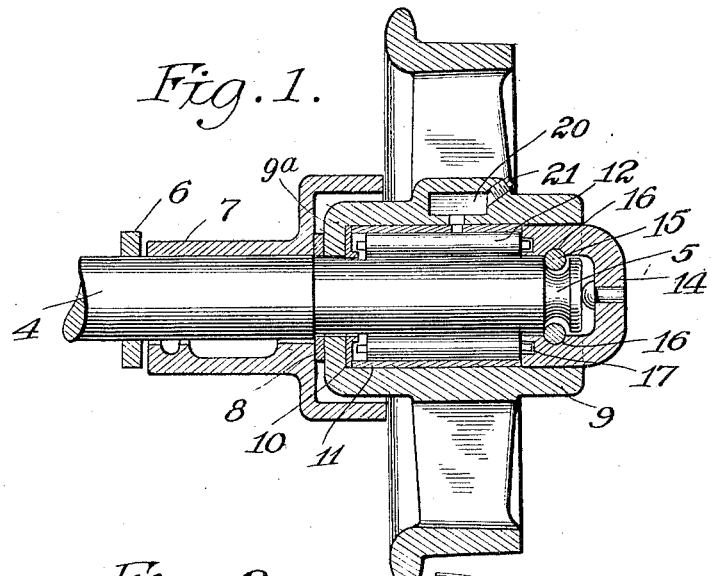
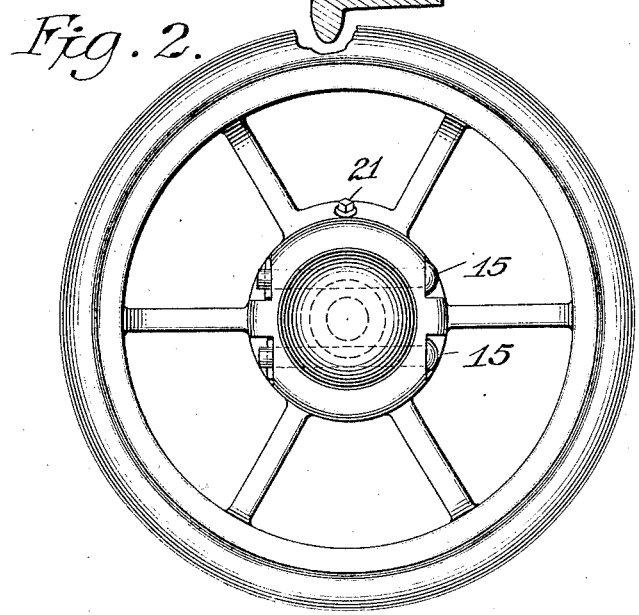
Inventor
Frederick H. Gibbs F. H. GIBBS.
WHEEL ATTACHING DEVICE FOR MINE CARS AND OTHER PURPOSES.
APPLICATION FILED JULY 26, 1918.

1,346,193.

Patented July 13, 1920.
2 SHEETS—SHEET 2.

Inventor
F. H. Gibbs

UNITED STATES PATENT OFFICE.

FREDERICK H. GIBBS, OF BROOKLYN, NEW YORK, ASSIGNOR TO WILLIAM H. WOODIN, OF NEW YORK, N. Y.

WHEEL-ATTACHING DEVICE FOR MINE-CARS AND OTHER PURPOSES.

1,346,193.  Specification of Letters Patent.  Patented July 13, 1920.

Application filed July 26, 1918. Serial No. 246,849.

*To all whom it may concern:*

Be it known that I, FREDERICK H. GIBBS, residing at the borough of Brooklyn, county of Kings, city and State of New York, and being a citizen of the United States, have invented certain new and useful Improvements in Wheel-Attaching Devices for Mine-Cars and other Purposes, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a central vertical longitudinal sectional view taken through a wheel showing the invention;

Fig. 2 is an elevational view of the same; and

Figure 3:
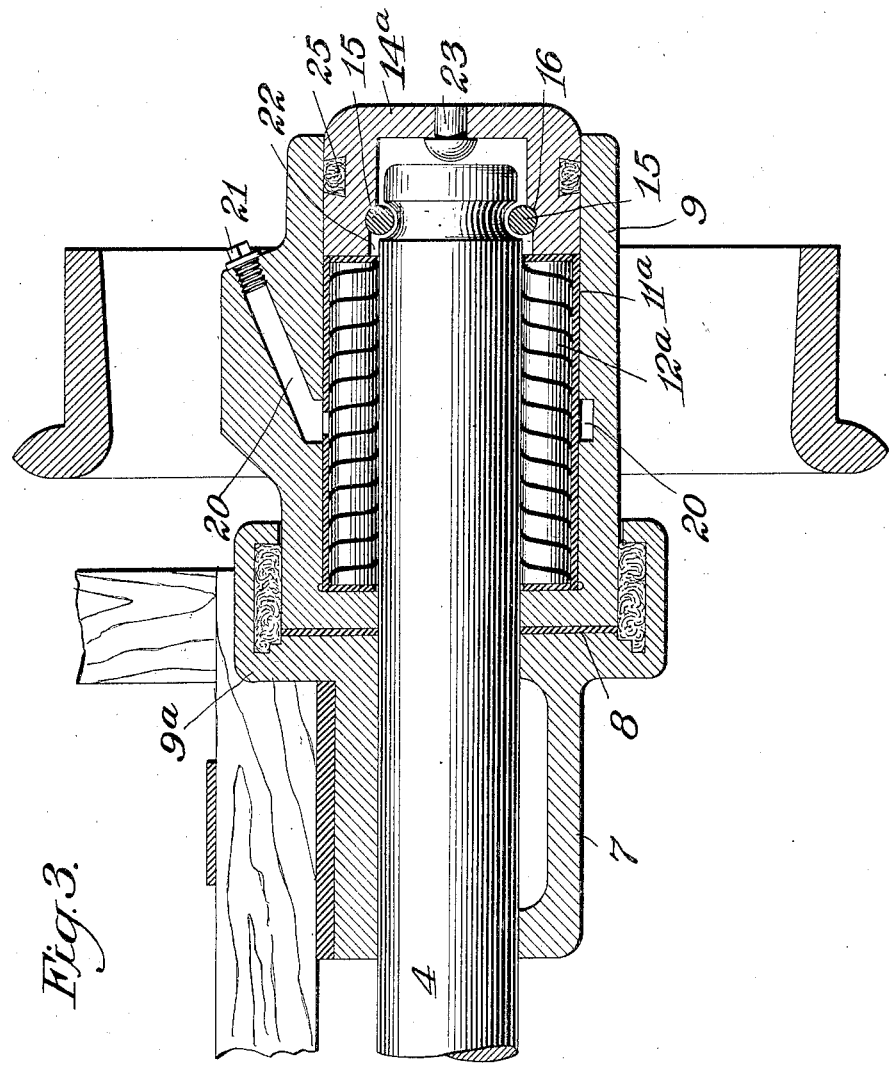
Fig. 3 is a central vertical longitudinal sectional view taken through a modified form of wheel in which the bearing rollers or roller bearing assembly is formed as a unit adapted to be inserted in the hub of the wheel and to be retained in position without extraneous support.

An object of the invention is to provide a wheel attaching device adapted to secure a wheel on an axle and the parts of the wheel in coöperative relation.

An object of the invention is to provide in a wheel adapted especially for use in mine cars, although adaptable for use in many other places, certain features of novelty by means of which the wheel is held upon an axle and the parts of the wheel are secured in coöperative relation by the same means, which also includes certain features of novelty, all as hereinafter more fully described.

An object of the invention is to provide a simple and rugged construction which may be made of the fewest number of parts, readily combined by unskilled labor and the parts so arranged as to show from the exterior of the wheel that they are connected and at the same time leaving the connecting means free for removal to facilitate repairs and replacement.

Generally speaking, the wheel comprises a hub, spokes and tread with the customary flange cast as an integer. The hub is provided with a central longitudinally arranged axle bore within which is disposed an axle and to which axle the wheel is secured by bolts extending through the hub, which bolts secure, within the outer end of the hub, a telescopically disposed cap, so positioned as to hold within the hub, bearing rollers adapted to serve as anti-friction means in service.

Other features of novelty will be hereinafter described.

One of the conveniences of the assembly is that the wheel hub may be bored of a predetermined diameter to fit a roller bearing assembly which may be, as shown in Fig. 1, provided with loose anti-friction rollers or, as shown in Fig. 2, with anti-friction rollers of the well known Hyatt roller bearing type.

Referring to the parts, 4 indicates an axle which is grooved circumferentially at 5 near its outer end on which axle is slipped a collar 6, a journal box 7 and a bearing washer 8, after which the wheel hub 9 is positioned as shown, and within said wheel hub there is provided a flanged annulus 10 and, bearing against said annulus 10, a sleeve 11, within which the roller bearings 12 are to rotate in contact with said sleeve and with the axle 4.

It will be noted that the roller bearings 12 are provided at each end with attenuated spindles which, at the inner end, coöperate with the flange of the annulus 10 and at the outer end are received in the circumferential channel 13 of the cap 14, which cap is held in position against said sleeve, as shown in Fig. 1, by means of the two bolts 15, 15, which, as shown, extend horizontally through the hub, being projected through coincident perforations in the walls of said hub and through coincident perforations in the walls of the cap 14, the bolts resting partly within grooves or depressions 16 within said cap 14 and in the annular groove 5 formed in the outer end of the axle 4.

When the bolts 15 are in position, as shown in Figs. 1 and 2, said bolts serve as securing means to lock the wheel upon the axle, to lock the cap 14 within the outer end of the hub of the wheel and, due to the bearing of the cap against the sleeve 11, said sleeve will be held in predetermined position as shown in Fig. 1, thereby maintaining the annulus 10 in the position shown in said Fig. 1, that is, in contact with the inner wall 9ª which closes in part the rear or inner end of the hub and serves as a bearing face against the washer hereinbefore referred to. Said cap also maintains the bearing rollers in their proper position, serving as a support for the outer end of said bearing rollers.

Lubricant is supplied to the interior of the wheel in any suitable manner, but preferably by means shown, said means comprising an oil receptacle 20 which may be plugged as at 21 by a screw threaded plug or provided with a spring oiler of the conventional type as may be desired, the lubricant passing from the oil receptacle 20 through suitable perforations in the shell of the hub and the sleeve, before referred to, into the roller bearing space within said sleeve and, as is well known, the lubricant will find its way longitudinally of the rollers both to the rear of the wheels and, as in the present instance, I provide a clear space 22, best shown in Fig. 3, between the inner face of the cap 14 and the axle. Lubricant will find its way from the roller bearing space into the end portion of the cap where it will fall by gravity during the rotation of the wheel and lubricate the head of the removable rivet 23 which is positioned within a suitable orifice in the vertical wall of said cap, the rivet head providing an end thrust bearing for the axle 4, which bearing may be removed, as desired, when worn in service without replacing other parts of the wheel.

The roller bearing assembly shown in Fig. 3, is substantially as in Fig. 1, with the exception that instead of the loose rollers, the well known Hyatt type of roller bearing has been substituted and the sleeve 11ª extends from the inner face of the portion 9ª of the wheel hub outwardly and preferably in contact with the inner end of the cap 14ª, which cap holds said sleeve in position, while within the sleeve, the hollow spiral rollers, as 12ª, are maintained surrounding the wheel axle, as is usual in said Hyatt roller bearing assembly.

The wheel is held upon the hub and the cap is held in the position in the modification shown in Fig. 3 as in the preceding figures, and, if desired, the cap may be provided with an annular groove or depression in its outer face, in which packing 25 may be placed, which packing effectually prevents the loss of lubricant from the interior of the hub through its outer face.

It is understood, of course, that the parts shown are duplicated at each end of the axle for the purpose of supporting a truck or any other type of vehicle which may be employed.

The wheel illustrated is adapted especially for use in mine cars but it is evident that the novel features are applicable to wheels for many other purposes, all within the scope of the invention set forth in the claims.

Having described my invention, what I claim as new and desire to secure by Letters Patent, is:

1. In combination, a wheel hub, an axle therein, bearing rollers in said wheel hub, a cap within the outer end of the hub adapted to hold said bearing rollers in position and means penetrating both hub and cap and engaging said axle to secure the hub, cap and axle in coöperative relation.

2. A wheel having a hub provided with an integral inner end wall and an open outer end, there being a longitudinal axle opening extending through said hub, a cap in the outer end of said opening, and means extending through the walls of said hub and cap and into said axle opening and adapted to interlock with a grooved axle extending into said hub to secure the wheel on the axle.

3. A wheel having a hub provided with a longitudinal opening therethrough, a cap fitted into the outer end of said opening, an axle extending into said cap, bearing rollers held in said opening by said cap, and means penetrating the hub and cap and engaging the axle to hold said parts in assembled relation.

4. In combination in a roller bearing wheel having a cap fitted into its hub portion, a bolt penetrating the hub and cap and extending into the axle bore to lock the wheel on an axle.

5. In combination in a roller bearing wheel having a cap fitted into its hub portion, a bolt penetrating the hub and cap and extending into the axle bore to lock the wheel on an axle, and bearing rollers held in position by said cap.

6. A car wheel having a hub, a removable cap therefor, an axle provided with a circumferential groove, and removable means passing through the cap and hub and adapted when in position to engage with the groove in the axle.

7. A wheel assembly comprising a grooved axle, a hub and a cap which are held in coöperative relation by bolts passing through said hub and cap and engaging the axle groove to lock the wheel on an axle.

8. In combination in a roller bearing wheel having a hub provided with a longitudinal axle bore, an annulus and a cap adapted to fit in said axle bore and retain bearing rollers in position, a grooved axle extending into said cap and bolts extending through the hub and cap and resting partly within a groove in the axle, thereby locking all of said parts in coöperative relation.

9. In combination in a mine car wheel, a cast hub having an integral inner wall adapted to serve as a bearing face and having a longitudinal axle bore, a perforated cap fitted into the outer end of said axle bore, a removable bearing in said cap adapted to take end thrust of an axle, a roller bearing sleeve locked in position by said inner wall and said cap, bearing rollers within said sleeve and means extending through said hub and perforated cap into the axle bore adapted to secure the wheel on an axle.

10. In combination, a wheel hub having an axle bore, bearing rollers in said wheel hub, a cap within the outer end of the hub and transversely extending pins penetrating both hub and cap and extending into said axle bore and adapted to secure the hub, cap and an axle in coöperative relation.

11. A wheel having a hub provided with an integral inner end wall and an open outer end, there being a longitudinal axle opening extending through said hub, an annulus in said axle opening, a cap in the outer end of said opening, bearing rollers adapted to be supported by said annulus and cap, and means extending through the walls of said hub and cap to lock said parts in coöperative relation.

12. A wheel having a hub provided with a longitudinal opening therethrough, an annulus and bearing rollers in said opening, a cap fitted into the outer end of said opening, an axle extending through said annulus and into said cap, the bearing rollers being held in said opening by said cap and transversely extending bolts penetrating the hub and cap and locking them on the axle.

13. In a wheel, a hub having an axle bore, a roller bearing therein, a closure for one end of said bore adapted to secure said bearing against endwise movement and tangentially disposed means extending through said hub into said axle bore to engage an axle therein.

14. In a roller bearing wheel, a hub portion having an enlarged axle bore and a lubricant chamber within said hub portion, a cap serving as an auxiliary lubricant chamber in communication with the first chamber and as a closure for the end of said hub, a roller bearing, means penetrating the hub and adapted to engage an axle extending into said cap and an end abutment for said axle within said cap.

15. In a roller bearing wheel, a hub having a roller bearing chamber, a roller bearing and a cap held in said chamber, an axle terminating within said cap and tangentially disposed means adapted to engage an axle said hub and the cap to hold said parts in coöperative relation.

16. A wheel having a hub portion closed at one end by a removable cap, a roller bearing held in said hub portion, an axle extending into said hub, roller bearing and cap; and a bolt engaging the hub, the cap and the axle to hold all of said parts in coöperative engagement.

17. In combination, a wheel hub, a roller bearing and a cap adapted to hold said roller bearing within said hub and means penetrating said hub and engaging the cap and adapted to prevent rotation of the cap with relation to the hub and to hold the wheel hub on an axle.

18. In a wheel, a hub, a roller bearing therein, a cap adapted to inclose the end of an axle and a bolt engaging the hub and the cap and adapted to engage the axle to hold all of said parts in coöperative relation.

19. In combination in a roller bearing wheel, a hub portion, a roller bearing therein, a cap non-rotatably held in said hub, and unitary means for holding said cap in fixed position and locking the wheel on an axle.

20. In a wheel, the combination with an axle having an annular groove, of a wheel mounted on the axle having a roller bearing cage, a cup-shaped member embracing the end of the axle and contacting with the bearing cage, and bolts passing through the hub of the wheel and engaging said cup-shaped member and groove of the axle.

21. The combination with an axle having an annular groove adjacent its outer end, of a wheel provided with a hub mounted on said axle, a bearing cage disposed within said hub, a cup-shaped member contacting with the bearing cage, and bolts passing through the hub of said wheel and engaging the cup-shaped member and groove of said axle.

22. The combination with an axle and its bearing, of a wheel having a hub, a roller bearing cage arranged within the bore of said hub, a cup-shaped member embracing the outer end of said axle and bearing against said roller bearing cage and means extending through said hub and engaging the axle to secure said wheel on the axle.

23. A mine car wheel having an axle bore, a bearing cage in said bore, a grooved axle in said bearing cage, a cap inclosing the end of said axle and means penetrating the wheel and engaging the cap and the axle groove to secure the wheel on said axle.

24. A wheel attaching device comprising a wheel having a hub provided with a bore to receive an axle, said bore having a roller bearing cage mounted therein, a member embracing the axle and contacting with said roller bearing cage and means penetrating said hub and adapted to engage said axle to hold the wheel thereon.

25. The combination with an axle having an annular groove adjacent its outer end, of a wheel hub having a bore to receive said axle, a roller bearing cage arranged within said bore, a member mounted in said hub and surrounding an outer end portion of said axle, said member having passages in register with said axle groove, and bolts passing through the wheel hub, said passages and into said axle groove for rotatably securing said wheel on the axle.

26. In a roller bearing wheel, a hub, a roller bearing therein, a member in said hub securing said roller bearing within the hub, an axle entering said member, said axle having an annular groove, and means engaging said groove adapted to lock all of said parts in coöperative relation.

27. In a roller bearing wheel, a hub portion having a lubricant reservoir therein, a roller bearing, a cap within the outer end of said hub and in communication with said reservoir, means adapted to hold said cap in position and at the same time hold the wheel on an axle and a removable end abutment for said axle penetrating said cap.

In witness whereof I have hereunto set my hand in the presence of two witnesses.

FREDERICK H. GIBBS.

Witnesses:
FLORA M. CURTIS,
HORACE G. PIERSON.